(12) United States Patent
Gonion et al.

(10) Patent No.: US 8,019,977 B2
(45) Date of Patent: *Sep. 13, 2011

(54) GENERATING PREDICATE VALUES DURING VECTOR PROCESSING

(75) Inventors: Jeffry E. Gonion, Campbell, CA (US); Keith E. Diefendorff, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 12/172,169

(22) Filed: Jul. 11, 2008

(65) Prior Publication Data

US 2008/0288745 A1 Nov. 20, 2008

Related U.S. Application Data

(63) Continuation-in-part of application No. 11/803,576, filed on May 14, 2007.

(51) Int. Cl.
*G06F 9/30* (2006.01)
(52) U.S. Cl. ..................................... 712/225
(58) Field of Classification Search .................. None
See application file for complete search history.

(56) References Cited

U.S. PATENT DOCUMENTS

| | | | |
|---|---|---|---|
| 5,381,536 A * | 1/1995 | Phelps et al. ............... | 711/168 |
| 5,781,752 A * | 7/1998 | Moshovos et al. ........... | 712/216 |
| 5,953,241 A | 9/1999 | Hansen | |
| 6,115,808 A * | 9/2000 | Arora ........................ | 712/219 |
| 6,295,599 B1 | 9/2001 | Hansen | |
| 6,308,250 B1 * | 10/2001 | Klausler ..................... | 712/5 |
| 6,584,482 B1 | 6/2003 | Hansen | |
| 6,643,765 B1 | 11/2003 | Hansen | |
| 6,725,356 B2 | 4/2004 | Hansen | |
| 7,213,131 B2 | 5/2007 | Hansen | |
| 7,216,217 B2 | 5/2007 | Hansen | |
| 7,260,708 B2 | 8/2007 | Hansen | |
| 7,301,541 B2 | 11/2007 | Hansen | |
| 7,353,367 B2 | 4/2008 | Hansen | |
| 7,430,655 B2 | 9/2008 | Hansen | |
| 7,464,252 B2 | 12/2008 | Hansen | |
| 7,509,366 B2 | 3/2009 | Hansen | |
| 7,516,308 B2 | 4/2009 | Hansen | |
| 7,653,806 B2 | 1/2010 | Hansen | |
| 7,660,972 B2 | 2/2010 | Hansen | |
| 7,660,973 B2 | 2/2010 | Hansen | |
| 7,730,287 B2 | 6/2010 | Hansen | |

* cited by examiner

*Primary Examiner* — Robert Fennema
(74) *Attorney, Agent, or Firm* — Park, Vaughan, Fleming & Dowler LLP; Steven E Stupp

(57) ABSTRACT

A method for performing parallel operations in a computer system when one or more memory hazards may be present, which may be implemented by a processor, is described. During operation, the processor receives instructions for detecting conflict between memory addresses in vectors when operations are performed in parallel using at least a portion of the vectors, and generating one or more predicate values corresponding to any detected conflict between the memory addresses, where a given predicate value indicates elements in at least the portion of the vector that can be processed in parallel. Next, the processor executes the instructions for detecting the conflict between the memory addresses and generating the one or more predicate values.

30 Claims, 13 Drawing Sheets

ENTRY CONDITIONS

P1 | 0 | 0 | 0 | 1 | 0 | 1 | 0 | 0 |

P2 | 0 | 0 | 0 | 0 | 0 | 0 | 0 | 0 |

EXIT CONDITIONS

P2 = GeneratePredicates(P1, P2) | 1 | 1 | 1 | 0 | 0 | 0 | 0 | 0 | 1st Pass

P2 | 0 | 0 | 0 | 1 | 1 | 0 | 0 | 0 | 2nd Pass

P2 | 0 | 0 | 0 | 0 | 0 | 1 | 1 | 1 | 3rd Pass

READ | 0 | 1 | 2 |
WRITE | 0 | 3 | 4 | Active Elements = 1 1 1 0 0 0 0 0

READ | 3 | 4 |
WRITE | 5 | 6 | Active Elements = 0 0 0 1 1 0 0 0

READ | 5 | 6 | 7 |
WRITE | 1 | 5 | 9 | Active Elements = 0 0 0 0 0 1 1 1

┌─────────────────────────────────────────────────────────────┐
│ RECEIVE INSTRUCTIONS FOR DETECTING CONFLICT BETWEEN MEMORY  │
│ ADDRESSES IN VECTORS WHEN MEMORY OPERATIONS ARE PERFORMED IN│
│ PARALLEL USING AT LEAST A PORTION OF THE VECTORS, AND TRACKS│
│ POSITIONS IN AT LEAST ONE OF THE VECTORS OF ANY DETECTED CONFLICT │
│ BETWEEN THE MEMORY ADDRESSES                                │
│ 210                                                         │
└─────────────────────────────────────────────────────────────┘
                              ↓
┌─────────────────────────────────────────────────────────────┐
│ EXECUTE THE INSTRUCTIONS FOR DETECTING THE CONFLICT BETWEEN THE │
│         MEMORY ADDRESSES AND TRACK THE POSITIONS            │
│                            212                              │
└─────────────────────────────────────────────────────────────┘

┌─────────────────────────────────────────────────────────────────┐
│  RECEIVE INSTRUCTIONS FOR DETECTING CONFLICT BETWEEN MEMORY     │
│ ADDRESSES IN VECTORS WHEN OPERATIONS ARE PERFORMED IN PARALLEL  │
│  USING AT LEAST A PORTION OF THE VECTORS, AND GENERATING ONE OR │
│    MORE STOP INDICATORS CORRESPONDING TO ANY DETECTED CONFLICT  │
│     BETWEEN THE MEMORY ADDRESSES, WHERE A GIVE STOP INDICATOR   │
│                   INDICATES A MEMORY HAZARD                     │
│                              240                                │
└─────────────────────────────────────────────────────────────────┘
                                │
                                ▼
┌─────────────────────────────────────────────────────────────────┐
│  EXECUTE THE INSTRUCTIONS FOR DETECTING THE CONFLICT BETWEEN THE│
│ MEMORY ADDRESSES AND GENERATING THE ONE OR MORE STOP INDICATORS │
│                              242                                │
└─────────────────────────────────────────────────────────────────┘
```

RECEIVE INSTRUCTIONS FOR DETECTING CONFLICT BETWEEN MEMORY ADDRESSES IN VECTORS WHEN OPERATIONS ARE PERFORMED IN PARALLEL USING AT LEAST A PORTION OF THE VECTORS, AND GENERATING ONE OR MORE PREDICATE VALUES CORRESPONDING TO ANY DETECTED CONFLICT BETWEEN THE MEMORY ADDRESSES, WHERE A GIVEN PREDICATE VALUE INDICATES ELEMENTS IN AT LEAST THE PORTION OF THE VECTOR THAT CAN BE PROCESSES IN PARALLEL
270

↓

EXECUTE THE INSTRUCTIONS FOR DETECTING THE CONFLICT BETWEEN THE MEMORY ADDRESSES AND GENERATING THE ONE OR MORE PREDICATE VALUES
272

FIG. 2C

EXIT CONDITIONS

| | | | | | | | | | |
|---|---|---|---|---|---|---|---|---|---|
| P = 0 | | 0 | 0 | 0 | 0 | 0 | 0 | 0 | 0 |
| P = CheckHazard(P, A, B) | | 0 | 0 | 0 | 0 | 0 | 1 | 0 | 0 | 1st Instruction
| P = CheckHazard(P, B, C) | | 0 | 0 | 0 | 0 | 0 | 1 | 0 | 0 | 2nd Instruction
| P = CheckHazard(P, A, C) | | 0 | 0 | 1 | 0 | 0 | 1 | 0 | 0 | 3rd Instruction

FIG. 9

ENTRY CONDITIONS

| | | | | | | | | | |
|---|---|---|---|---|---|---|---|---|---|
| B | | 0 | 1 | 2 | 3 | 4 | 5 | 6 | 7 | Indices of A[] to be read
| C | | 0 | 3 | 4 | 5 | 6 | 1 | 5 | 9 | Indices of A[] to be written
| P | | 0 | 0 | 0 | 0 | 0 | 0 | 0 | 0 | Initially an empty vector

EXIT CONDITIONS

| | | | | | | | | |
|---|---|---|---|---|---|---|---|---|
| P = CheckHazardGen(P, B, C) | 1 | 1 | 1 | 0 | 0 | 0 | 0 | 0 |
| P = CheckHazardGen(P, B, C) | 0 | 0 | 0 | 1 | 1 | 0 | 0 | 0 |
| P = CheckHazardGen(P, B, C) | 0 | 0 | 0 | 0 | 0 | 1 | 1 | 1 |
| P = CheckHazardGen(P, B, C) | 0 | 0 | 0 | 0 | 0 | 0 | 0 | 0 |

FIG. 10

P4 = CheckHazardStopIndexVR(B, C, D) | 0 | 0 | 1 | 0 | 1 | 0 | 1 | 0 |

P3 = CheckHazardIndex(P, B, D) | – | – | – | 0 | 2 | 3 | 4 | 5 |

P3 = CheckHazardIndex(P, C, D) | – | – | 0 | 1 | 3 | 3 | 5 | 5 |

P1 = GeneratePredicatesIndex(P1, P3) | 1 | 1 | 0 | 0 | 0 | 0 | 0 | 0 |

P1 = GeneratePredicatesIndex(P1, P3) | 0 | 0 | 1 | 1 | 0 | 0 | 0 | 0 |

P1 = GeneratePredicatesIndex(P1, P3) | 0 | 0 | 0 | 0 | 1 | 1 | 0 | 0 |

P1 = GeneratePredicatesIndex(P1, P3) | 0 | 0 | 0 | 0 | 0 | 0 | 1 | 1 |

FIG. 12E

GENERATING PREDICATE VALUES DURING VECTOR PROCESSING

CROSS REFERENCE TO RELATED APPLICATIONS

This application is a continuation-in-part of co-pending U.S. patent application Ser. No. 11/803,576, filed on May 14, 2007, entitled "Memory-Hazard Detection and Avoidance Instructions for Vector Processing," which is herein incorporated by reference. This application hereby claims priority under 35 U.S.C. §120 to the above-listed parent patent application.

This application is also related to co-pending U.S. patent application Ser. No. 12/172,173, filed on Jul. 11, 2008, entitled "Detecting Memory-Hazard Conflicts During Vector Processing," and to co-pending U.S. patent application Ser. No. 12/172,161 filed on Jul. 11, 2008, entitled "Generating Stop Indicators During Vector Processing," each of which are herein incorporated by reference.

BACKGROUND

1. Field of the Invention

The present invention relates to techniques for improving computer system performance. More specifically, the present invention relates to instructions that prevent memory hazards in vector or parallel processing.

2. Related Art

There are many impediments to the parallelization of computational operations in parallel processing systems. Among these impediments, one of the more difficult problems to address is memory hazards, such as address hazards, in which different memory references refer to the same address. The potential for memory hazards often restricts exploitation of many features available in modern high-performance processors. For example, memory hazards may block instruction-level parallelism (ILP) by preventing load instructions from being hoisted above store instructions. Furthermore, memory hazards may block data-level parallelism (DLP) by preventing compilers from vectorizing loops, or may block thread-level parallelism by preventing threads from being spawned.

In the case of ILP, existing processors typically attempt to move loads upward in the instruction stream with the goal of initiating memory transactions as early as possible while the processor performs other work in parallel. For example, out-of-order processors often use hardware mechanisms to hoist loads. All such processors implement some form of dynamic (runtime) memory disambiguation in hardware, for example, by using a memory order buffer (MOB) to prevent a computer from erroneously moving a load ahead of a preceding store that turns out to be directed to the same address.

In contrast, in-order processors use a compiler to explicitly hoist loads. However, these compilers operate without the benefit of runtime information and, therefore, cannot always predetermine if moving a load ahead of a store will be safe. This uncertainty forces these compilers to be conservative in hoisting loads which greatly sacrifices performance. This also greatly limits performance in superscalar in-order computers, such as those that implement very-long-instruction-word (VLIW) architectures. To address this problem, some of these computers include hardware mechanisms that enable their compilers to more aggressively hoist loads. In particular, these mechanisms enable the compiler to speculatively hoist a load by providing a hardware-checking mechanism which either verifies at runtime that the movement of a load was legitimate or which generates an exception after a memory-hazard problem is encountered to allow software to repair the problem.

In the case of DLP, existing autovectorizing compilers cannot freely vectorize code for exactly the same memory-hazard-related reasons that scalar and superscalar processors cannot freely reorder loads and stores. In particular, aggregating a set of temporally sequential operations (such as loop iterations) into a spatially parallel vector creates essentially the same problem as reordering the loads and stores. In either case, the sequential semantics of the program are potentially violated. Just as compilers cannot always predetermine when it is safe to reorder loads above stores, a vectorizing compiler cannot predetermine when it is safe to group sequential operations into a parallel vector of operations. However, in the case of vector processors the ramifications are more than a mere incremental performance loss. The entire advantage behind vector processing is defeated. Consequently, vector processors are rarely built and those with short-vector facilities, such as Single-Instruction-Multiple-Data (SIMD) processors, are often underutilized. The underlying problem for these processors is that existing compilers are severely limited in their ability to automatically vectorize code due to their inability to statically disambiguate memory references.

Similarly, in the case of thread-level parallelism existing multithreading compilers are often prevented from spawning multiple parallel threads due to the potential for memory hazards. This limitation may not be a large problem for existing multi-core and multithreaded processors because they currently operate using coarse-grain threads and depend upon explicit parallelization by human programmers. Unfortunately, it is difficult to scale these manual parallelization techniques. Consequently, to facilitate fine-grain multithreaded execution (in which each iteration of a loop may be processed by a different processor or core), compilers will need to overcome memory-address-hazard problems to automatically parallelize programs.

Hence what is needed is a technique to facilitate vector or parallel processing in the presence of memory hazards without the above-described problems.

SUMMARY

One embodiment of the present invention provides a method for performing parallel operations in a computer system when one or more memory hazards may be present, which may be implemented by a processor. During operation, the processor receives instructions for detecting conflict between memory addresses in vectors when operations are performed in parallel using at least a portion of the vectors, and generating one or more predicate values corresponding to any detected conflict between the memory addresses, where a given predicate value indicates elements in at least the portion of the vector that can be processed in parallel. Next, the processor executes the instructions for detecting the conflict between the memory addresses and generates the one or more predicate values.

In some embodiments, conflict between the memory addresses includes overlap of the memory addresses. Moreover, conflict between the memory addresses in the vectors may be associated with at least one memory hazard.

In some embodiments, detecting the conflict involves determining matches between the memory addresses.

In some embodiments, conflict between the memory addresses in the vectors is associated with at least one memory hazard that leads to different results when the memory addresses are accessed in parallel during the memory operations than when the memory addresses are accessed in program order.

In some embodiments, a subsequent conflict is rendered benign by performing a portion of the memory operations in parallel.

In some embodiments, the vectors include a first vector and a second vector, where detecting involves comparing memory addresses in the first vector with memory addresses in the second vector. Moreover, a memory address associated with a given position in the second vector may be compared to one or more memory addresses in the first vector associated with positions that correspond to loop iterations that are after the iteration corresponding to the given position.

In some embodiments, the vectors include a first vector and a second vector, where the detecting involves comparing memory addresses in the first vector with memory addresses in the second vector. Moreover, a memory address associated with a given position in the second vector may be compared to one or more memory addresses in the first vector associated with positions that correspond to loop iterations that are before the iteration corresponding to the given position.

In some embodiments, the parallel processing may be performed by multiple processors and/or by multiple threads that may be to executed by multiple cores.

Another embodiment provides the processor.

Another embodiment provides a compiler that generates instructions based on a feature set of the processor, where instructions include at least some of the preceding instructions.

Another embodiment provides a computer system that includes the processor and a memory. This computer system is configured to execute at least some of the preceding instructions.

BRIEF DESCRIPTION OF THE FIGURES

FIG. 2A is a flow chart illustrating a process for performing parallel operations in a computer system when one or more memory hazards may be present.

FIG. 2B is a flow chart illustrating a process for performing parallel operations in a computer system when one or more memory hazards may be present.

FIG. 2C is a flow chart illustrating a process for performing parallel operations in a computer system when one or more memory hazards may be present.

FIG. 9 illustrates the determination of stop indicators in accordance with an embodiment of the present invention.

FIG. 10 illustrates the determination of stop indicators in accordance with an embodiment of the present invention.

FIG. 12C illustrates the determination of memory hazards in accordance with an embodiment of the present invention.

FIG. 12D illustrates the determination of memory hazards in accordance with an embodiment of the present invention.

FIG. 12E illustrates the generation of predicates in accordance with an embodiment of the present invention.

Figure 1A:
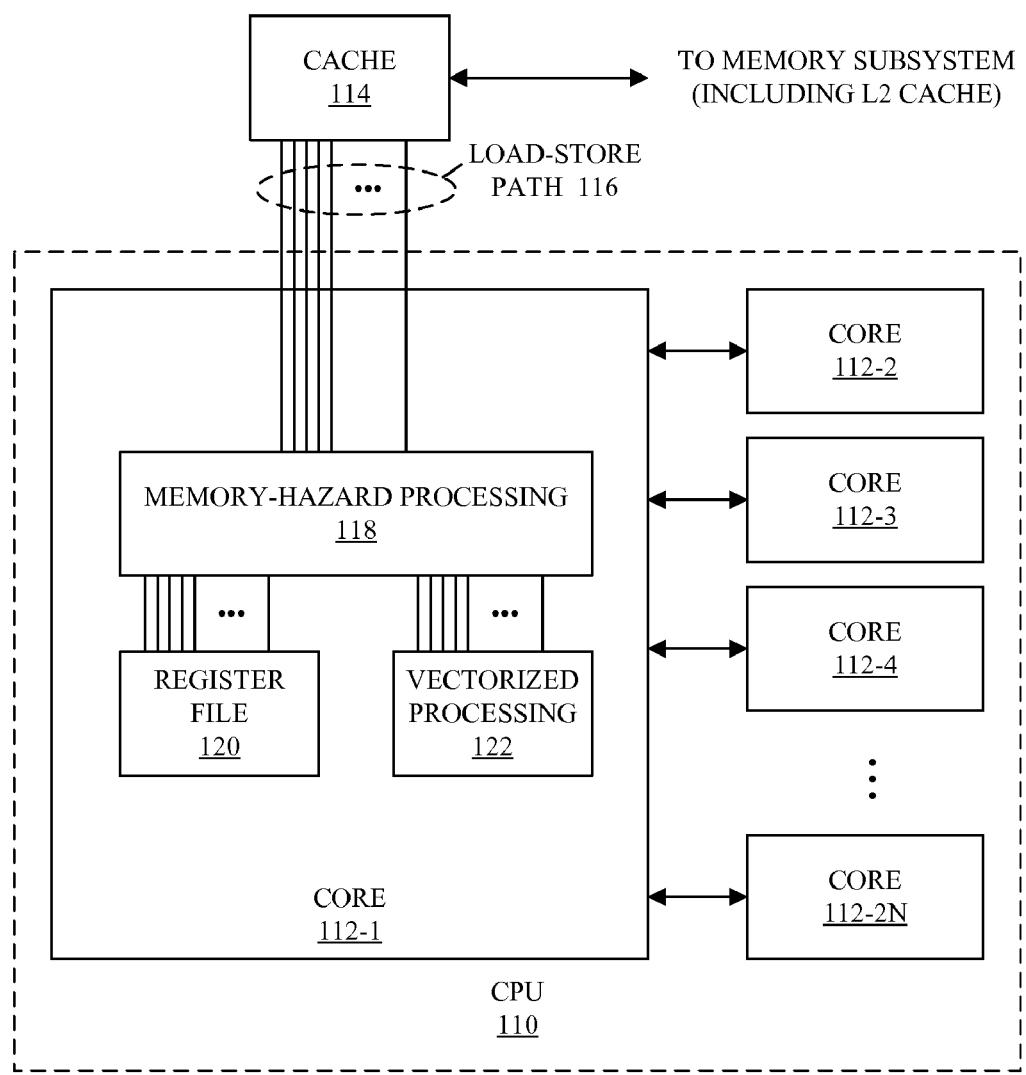
FIG. 1A is a block diagram illustrating a computer system in accordance with an embodiment of the present invention.

Table 1 provides pseudo-code in accordance with an embodiment of the present invention.

Table 2 provides pseudo-code in accordance with an embodiment of the present invention.

Table 3 provides pseudo-code in accordance with an embodiment of the present invention.

Table 4 provides pseudo-code in accordance with an embodiment of the present invention.

Table 5 provides pseudo-code in accordance with an embodiment of the present invention.

Table 6 provides pseudo-code in accordance with an embodiment of the present invention.

Table 7 provides pseudo-code in accordance with an embodiment of the present invention.

Table 8 provides pseudo-code in accordance with an embodiment of the present invention.

Table 9 provides pseudo-code in accordance with an embodiment of the present invention.

Table 10 provides pseudo-code in accordance with an embodiment of the present invention.

Table 11 provides pseudo-code in accordance with an embodiment of the present invention.

Table 12 provides pseudo-code in accordance with an embodiment of the present invention.

Table 13 provides pseudo-code in accordance with an embodiment of the present invention.

Table 14 provides pseudo-code in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Embodiments of a processor, a computer system, a compiler, and a technique that facilitate parallel or vector processing in the presence of memory hazards. In particular, these devices, systems, and/or techniques may be used to mitigate or cope with the effects of memory hazards (when present) in a variety of environments, including: data-level-parallelism (DLP) machines, autovectorizing compilers, fine-grain threaded processors, and/or autothreading compilers. (With respect to parallelization of operations, note that memory hazards result from multiple references to the same memory location that may potentially occur in a different order when operations are executed in parallel than they would when the operations are performed sequentially.) These techniques may be applied in macroscalar-class processors or microprocessors (which allow multiple iterations of a loop to execute in parallel, where the degree of parallelization is determined at run-time) and/or vector-style macroscalar processors or microprocessors (in which the effective vector length is changed dynamically, either by means of a variable vector length, or through predication of operations on certain elements of the vector).

In some embodiments, the technique involves detecting and locating so-called 'critical memory hazards' which have the potential to cause different results when memory addresses (corresponding to scalars, partial vectors, and/or vectors) are accessed in parallel than when the memory addresses are accessed sequentially. Note that elements of the scalars, partial vectors, and/or vectors may include: one or more bits, one or more bytes, and/or one or more words (which each include N bits). Furthermore, note that the memory addresses that critical memory-hazard detection may be applied to include: actual addresses, array indexes, or any other surrogate of memory addresses (such as memory pointers).

In some embodiments, one or more memory hazards are first detected and then one or more critical memory hazards are determined from the one or more memory hazards. In particular, when the one or more memory hazards are detected, memory locations associated with the one or more memory hazards may also be tracked. Next, a refining operation is performed to remove information associated with one or more non-critical memory hazards or redundant information associated with the one or more critical memory hazards. For example, the refining operation may include a maximum operation that returns the larger of values associated with a given memory location that are compared, or a minimum operation that returns the smaller of the values associated with a given memory location that are compared.

Once a critical memory hazard has been located, predicate vectors are produced that a processor can use to specify the elements for which operations (including the memory operations) may safely be performed in parallel for one or more sets of consecutive elements in a partial vector or a full vector. For example, the operations may be performed in a loop, and the predicate values may be used to mask elements in the partial vector or the full vector thereby allowing elements in the one or more sets of consecutive elements to be processed in parallel. In this way, incorrect behavior due to actual memory hazards can be avoiding thereby facilitating parallel processing.

By providing mechanisms to guarantee correct program execution in the presence of possible memory hazards, and by using the techniques described below, processors, microprocessors, and/or autovectorizing compilers may be better able to use code optimization techniques (such as parallel or vector processing) even in the presence of dynamic program behavior.

Note that the data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), and/or other media capable of storing computer-readable media now known or later developed.

We now describe embodiments of a computer system that includes one or more processors. FIG. 1A presents a block diagram illustrating a computer system 100 in accordance with an embodiment of the present invention. Computer system 100 may generally include any type of computer system, including, but not limited to: a computer system based on a processor or microprocessor, a mainframe computer, a digital signal processor, a portable computing device, a personal organizer, a device controller, a cell phone, and/or a computational engine within an appliance.

Computer system 100 includes a central-processing unit (CPU) 110 which performs computational operations. While performing these computational operations, CPU 110 operates on data items retrieved from cache memory 114 via a load-store path 116. Note that cache memory 114 is coupled to a memory subsystem (not illustrated). In one embodiment of the present invention, cache memory 114 is a Level-One (L1) data cache which communicates with a memory subsystem that includes a Level-Two (L2) unified instruction/data cache and a main memory.

CPU 110 includes multiple cores 112. One or more of these cores 112 includes memory-hazard processing module 118 (for example, in an execution unit), which executes instructions for detecting critical memory hazards (which are referred to as CheckHazard instructions) and determining one or more stop indicators during the processing of vectors or portions of vectors, such as a partial vector. Note that if a critical memory hazard is detected, a minimum number of stop indicators are calculated (where a given stop indicator may include one or more bits). Furthermore, the presence of a memory hazard may be detected when software is compiled and/or at runtime when the associated code is executed. And in some embodiments stop indicators may be identified for multiple vectors or portions of vectors concurrently or independently of one another.

Memory-hazard processing module 118 may also execute instructions for generating predicate vectors (which are referred to as GeneratePredicates instructions) for vectors or partial vectors based on the stop indicators. These instructions define how to partition the vector or the partial vector. For example, one or more sets of continuous elements in the vectors or partial vectors may be processed in parallel based on the predicate values. Note that a register file 120 may hold the stop indicators, the associated predicate vectors, and operands that are to be processed by functional units within the CPU 110 and/or core 112-1.

Figure 1B:
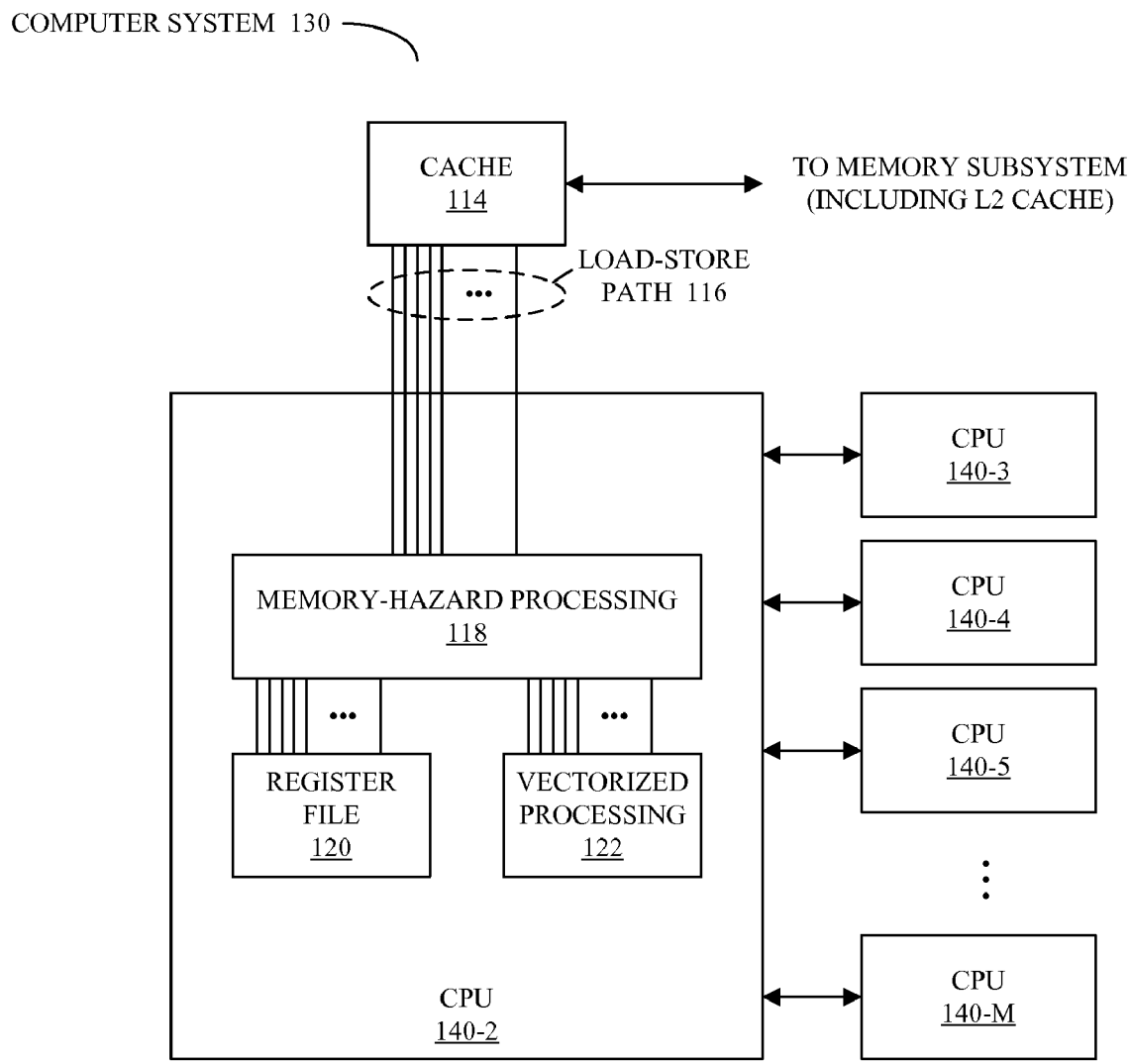
FIG. 1B is a block diagram illustrating a computer system in accordance with an embodiment of the present invention.

Furthermore, vector processing module 122 may assign portions of the vector or partial vector to one or more of the cores 112 for processing. In some embodiments, this processing is implemented using multiple CPUs. This is illustrated in FIG. 1B, which presents a computer system 130 that includes CPUs 140 in accordance with an embodiment of the present invention.

Note that while the computer system 100 (FIG. 1A) and/or the computer system 130 are illustrated as having a number of components in a given configuration, in other embodiments the computer system 100 (FIG. 1A) and/or the computer system 130 include fewer components or additional components, two or more components are combined into a single component, and/or a position of one or more components is be changed. For example, in some embodiments the techniques described below are implemented within existing modules in CPU 110 (FIG. 1A) and/or CPU 140.

We now describe embodiments of a method for performing parallel operations in the computer system when one or more memory hazards are present. FIG. 2A is a flow chart illustrating a process 200 for performing parallel operations in a computer system when one or more memory hazards may be present, which may be implemented by a processor. During operation, the processor receives instructions for detecting conflict between memory addresses in vectors when memory operations are performed in parallel using at least a portion of the vectors, and tracks positions in at least one of the vectors of any detected conflict between the memory addresses (210). Next, the processor executes the instructions for detecting the conflict between the memory addresses and tracks the positions (212).

FIG. 2B is a flow chart illustrating a process 230 for performing parallel operations in a computer system when one or more memory hazards may be present, which may be implemented by a processor. During operation, the processor receives instructions for detecting conflict between memory addresses in vectors when operations are performed in parallel using at least a portion of the vectors, and generating one or more stop indicators corresponding to any detected conflict between the memory addresses (240), where a given stop indicator indicates a memory hazard. Next, the processor executes the instructions for detecting the conflict between the memory addresses and generates the one or more stop indicators (242).

FIG. 2C is a flow chart illustrating a process 260 for performing parallel operations in a computer system when one or more memory hazards may be present, which may be implemented by a processor. During operation, the processor receives instructions for detecting conflict between memory addresses in vectors when operations are performed in parallel using at least a portion of the vectors, and generating one or more predicate values corresponding to any detected conflict between the memory addresses (270), where a given predicate value indicates elements in at least the portion of the vector that can be processed in parallel. Next, the processor executes the instructions for detecting the conflict between the memory addresses and generates the one or more predicate values (272).

Note that in some embodiments of the processes 200 (FIG. 2A), 230 (FIG. 2B) and/or 260 there may be additional or fewer operations. Moreover, the order of the operations may be changed and/or two or more operations may be combined into a single operation.

We now describe embodiments that detect critical memory hazards and generate predicates. CheckHazard instructions compare two items (such as two vectors, two partial vectors, or combinations of scalars, vectors, and partial vectors) containing memory addresses, indexes, and/or other addressing-related information to detect if there are one or more critical memory hazards between memory items referenced by the elements of each item. In the discussion that follows, vectors are used as illustrative examples of items. Note that these items may be located in processor registers or in memory. Also note that critical memory hazards include memory hazards that could produce incorrect program behavior if the memory indicated by a first vector was read or written before the memory indicated by a second vector is read or written.

CheckHazardVR instructions detect critical memory hazards for read-after-write, write-after-read, and write-after-write code sequences or operations. Note that memory hazards in read-after-read code sequences are never critical, so it need not be checked. In the discussion that follows, Check-Hazard instructions for handling read-after-write and write-after-read code sequences using two vectors are referred to as CheckHazardVR instructions.

Consider the operation of the loop presented in Table 1. The loop in this example cannot be vectorized because of potential memory hazards between elements of A. Note that a CheckHazardVR instruction detects the memory hazards and supplies information to allow vectorized code to be executed safely. Because of this guarantee, the compiler is able to generate vectorized code for loops for which it would normally be unsafe to do so. In particular, autovectorization causes the indexes into A contained in B and C to be placed into two vector registers. Then, the CheckHazardVR instruction detects where the vector must be broken into sub-vectors (i.e., the position of stop indicators) to ensure correct program behavior during parallel processing. Note that the definition of elements in the vectors that are to be processed concurrently is based on predicate values generated from these stop indicators.

Figure 3:
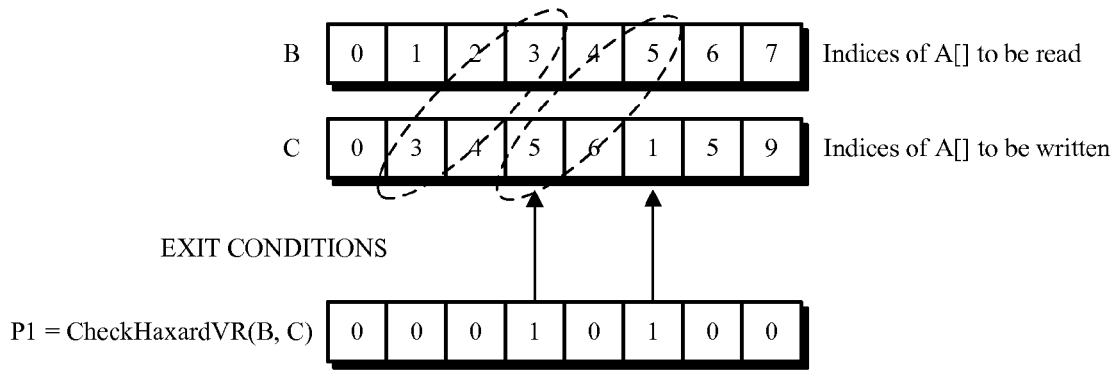
FIG. 3 illustrates the determination of stop indicators in accordance with an embodiment of the present invention.

TABLE 1 for (x=0; x<100; ++x)
    A[C[x]] = A[B[x]] + 1;

This is illustrated in FIG. 3, which presents the determination of stop indicators using CheckHazard instructions in accordance with an embodiment of the present invention. Note that an element of a vector corresponds to the value of a scalar, and time (iterations) increase going from left to right in vectors B and C, and memory-hazard conditions are illustrated by dashed ellipses. Furthermore, for a write operation followed by a read operation, the stop indicator at position or element 4 in iteration-control vector P1 covers memory hazards for the '3' and the '4' indices, and the stop indicator at position or element 6 in P1 covers memory hazards for the '5' and the '6' indices in vectors B and C. These positions in vectors B and C corresponding to the stop indicator in P1 are illustrated by the vertical arrows in FIG. 3.

Figure 4:
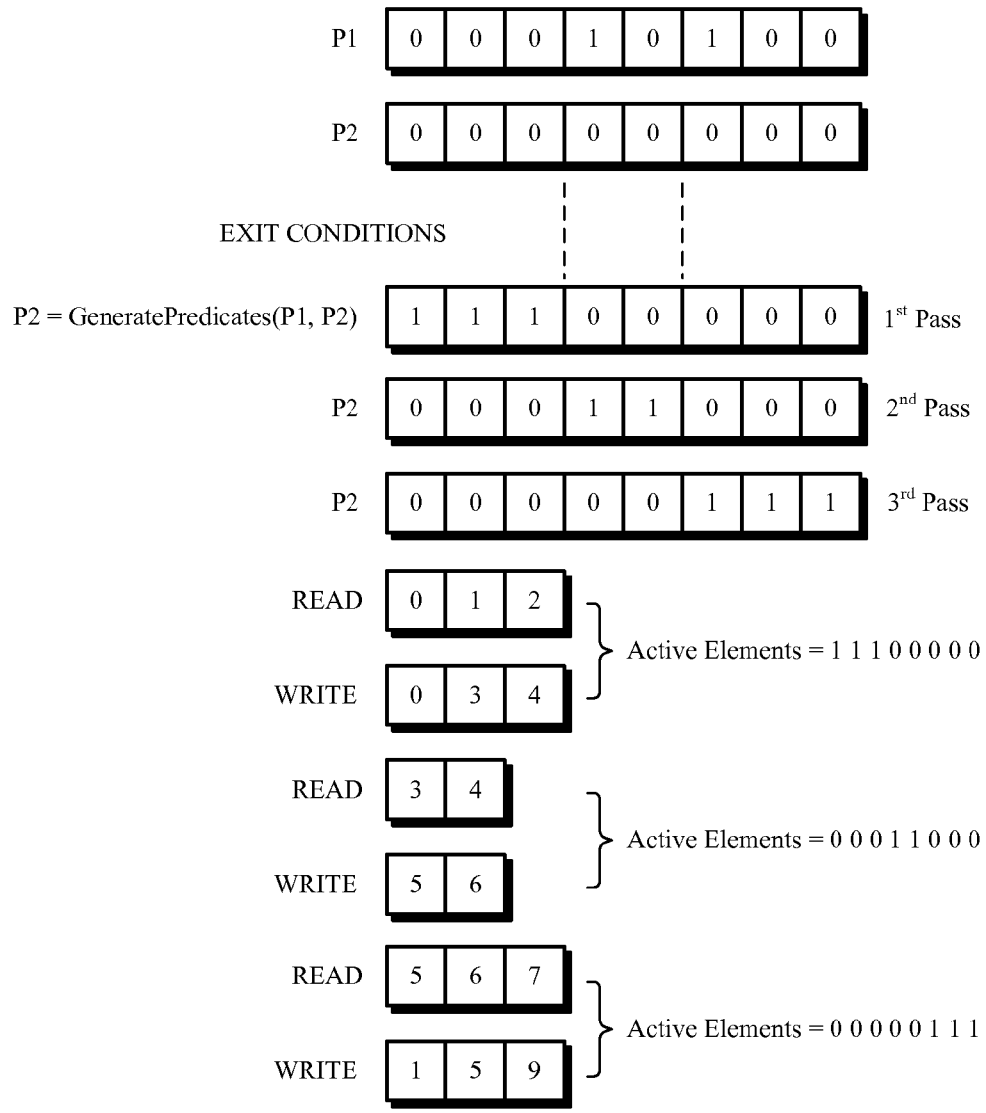
FIG. 4 illustrates the generation of predicates in accordance with an embodiment of the present invention

Note that P1 identifies which loop iterations cannot be run in parallel with preceding loop iterations, and thus determines boundaries that can be used for piecewise iteration of these sub-vectors over a full vector. Although P1 may be a predicate vector, in some embodiments it is not used directly for predication of individual elements. Instead, P1 may be used to generate predicate vectors, such as P2. This is illustrated in FIG. 4, which presents the generation of predicates using GeneratePredicates instructions in accordance with an embodiment of the present invention.

In particular, P2 indicates the elements to be processed to implement the piecewise processing of a single vector. As illustrated in FIG. 4, P2 may be determined iteratively, where as many vector elements are included as possible (until the next stop indicator in P1), and this process is repeated in subsequent iterations until all of the elements in the vector are included. This technique allows the code to achieve the greatest amount of parallelism possible for the given memory-hazard conditions.

In this example, breaking the vector before the first set stop indicator changes the criticality of the remaining memory-hazard elements. Note that while there appears to be a critical memory hazard between the read and write of elements A[4] and A[6], stop indicators are only set for elements A[3] and A[5]. This is because once parallelization is broken before element A[3] is read, then the memory hazard of element A[4] becomes benign because it lies in the shadow of the break in parallelism caused by the memory hazard on element A[3]. Note that this also applies for A[6] living in the shadow of A[5].

Table 2 presents pseudo-code that illustrates the operation of CheckHazardVR instructions in accordance with an embodiment of the present invention. Note that this pseudo-code determines matches between elements in two vectors and where the memory hazard(s) occurs. Also note that because a critical memory hazard never exists in the first element in a given vector, it can be set to either polarity because it has no effect on how the vector is broken into sub-vectors.

TABLE 2

```
for (x=0; x<VECLEN; ++x)
    P[x] = 0;
for (z=0; z<VECLEN-1; z=pos)
{
    pos = VECLEN;
    for (y=z; y<VECLEN-1; ++y)
    {
        for (x=y+1; x<VECLEN; ++x)
        {
            if (Vb[y] == Va[x])
                if (x < pos)
                    pos = x;
        }
    }
    if (pos < VECLEN)
        P[pos] = 1;
}
```

Note that the preceding example applies to byte-wide memory accesses. For larger memory accesses, additional logic may be used to detect memory references that partially overlap. However, this may not be necessary in processors or microprocessors that only support naturally-aligned memory access.

While write-after-write memory hazards can be correctly handled using CheckHazardVR instructions, there are additional optimizations that may be employed in write-write situations. In the discussion that follows, CheckHazard instructions for write-after-write operations using two vectors is referred to as CheckHazardVW instructions. Note that a CheckHazardVW instruction compares two vectors to determine if there are one or more critical memory hazards between memory items referenced by the elements of each vector in the case that both vectors represent memory references that are to be written to.

Figure 5:
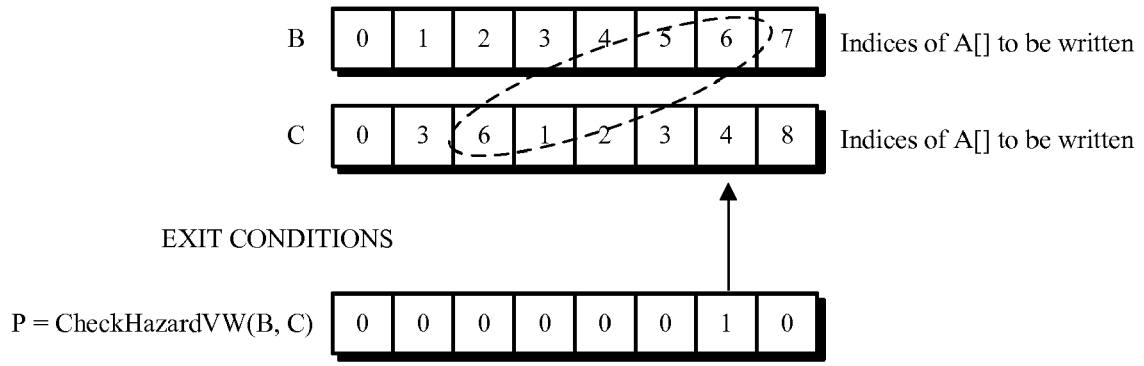
FIG. 5 illustrates the determination of stop indicators in accordance with an embodiment of the present invention.

Consider the operations in the loop presented in Table 3 and the associated determination of stop indicators presented in FIG. 5. Note that the entry conditions show memory hazards on elements A[3] and A[6]. However, because element A[3] is written twice (via C[ ]) only the final write of element A[3] is important (there are no reads of A[ ] in this loop). Therefore, the memory hazard on element A[3] is benign, while the memory hazard on element A [6] is critical.

TABLE 3

```
for (x=0; x<100; ++x)
{
    A[B[x]] = x;
    A[C[x]] = -x;
}
```

In some embodiments, programmatically correct intermediate states are constructed. These intermediate states represent the state of memory at some loop mid-vector iteration. Examples include cases where A [ ] is read in the loop, or an external function is conditionally called within the loop. In such cases, the compiler may revert to the CheckHazardVR instruction to guarantee correct intermediate states.

Memory-hazard checking may also be performed between a scalar storage address and a vector of storage addresses (which are implemented using CheckHazardS instructions). Note that a CheckHazardS instruction compares a scalar and a vector containing memory addresses, indexes, and/or other addressing-related information to determine if there are one or more critical memory hazards between memory items referenced by the scalar and the vector. Results of the CheckHazardSV and CheckHazardVS instructions are equivalent to replicating the scalar across all elements of a vector, and performing the CheckHazardVR operation on the two resulting vectors.

Figure 6:
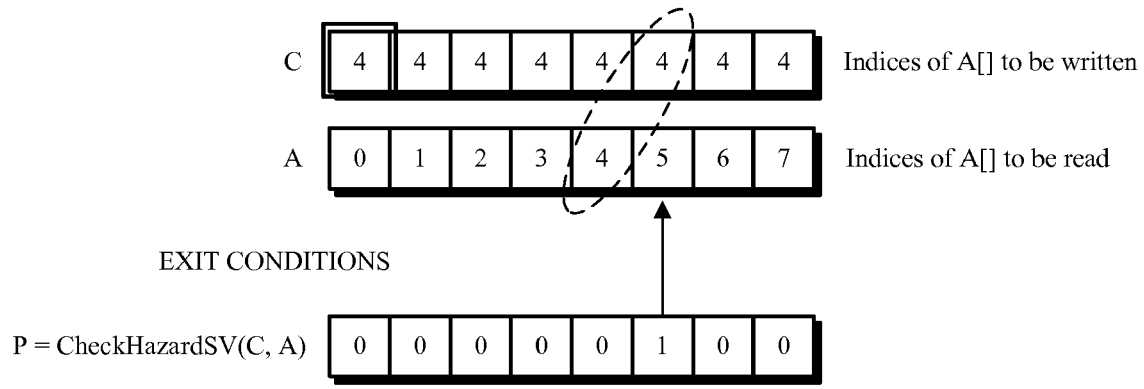
FIG. 6 illustrates the determination of stop indicators in accordance with an embodiment of the present invention.

Consider the operations in the loop presented in Table 4 and the associated determination of stop indicators presented in FIG. 6. Here we ignore possible memory hazards on B[ ] (at least for a moment), and first determine whether any element of A[ ] has a memory hazard with the scalar pointer C. Note that the stop indicator occurs such that the last write still results in a correct read.

TABLE 4

```
for (x=0; x<100; ++x)
{
    *C = x + 1;
    B[x] = A[x] + 1;
}
```

Figure 7:
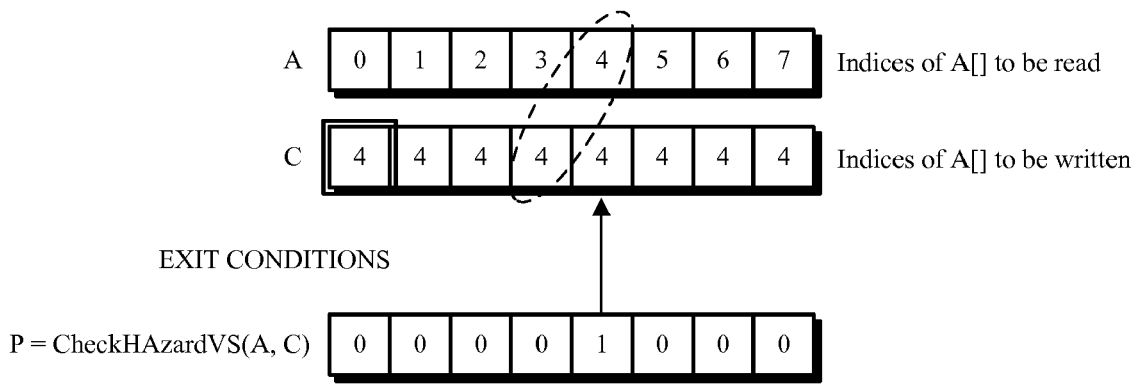
FIG. 7 illustrates the determination of stop indicators in accordance with an embodiment of the present invention.

Another example of operations in a loop is presented in Table 5 and the associated determination of stop indicators is presented in FIG. 7.

TABLE 5

```
for (x=0; x<100; ++x)
{
    B[x] = A[x] + 1;
    *C = x + 1;
}
```

In some embodiments, CheckHazard instructions are themselves predicated. Thus, a predicate vector may be passed-in, indicating which elements should be processed by the CheckHazard instruction. If the predicate bit corresponding to a particular element is inactive, that element is not considered in the memory-hazard checking process.

In some embodiments, the CheckHazard instruction may return stop indicators for each element in a first vector that indicate which element in a second vector presents a memory hazard against it. This information facilitates the optimal combination of stop indicators from multiple CheckHazard iterations.

Consider the operations in the loop presented in Table 6, and the corresponding pseudo-code presented in Table 7 (which checks for memory hazards between B and C and/or between C and D). This example allows maximum parallelism in the presence of unknown memory-hazard conditions. In this case, it is assumed that the compiler is able to establish that there are no memory hazards between A [ ] and B/C/D. However, because memory hazards between elements of A[ ] are dynamic and data-dependent, these memory hazards cannot be resolved by the compiler.

TABLE 6

```
for (x=0; x<100; ++x)
{
    r = A[B[x]];
    A[C[x]] = A[D[x]] + r;
}
```

TABLE 7

```
Loop0:
    Bx = Read B[x * VECLEN];           // Load B, C, D vectors
    Cx = Read C[x * VECLEN];           // Gives indexes into A[ ]
    Dx = Read D[x * VECLEN];
    P1 = CheckHazardVR(Bx, Cx);        // Check B against C (R versus W)
    Pa = 0;
    Pa = GeneratePredicates(P1, Pa);   // Generate active elements
Loop1:                                 // Active elements indicated by Pa
    r = Pa:Read(A[Bx]);                // Read A per active elements of B
    P2 = Pa:CheckHazardVR(Dx, Cx);     // Check D against C (R versus W)
    Pb = 0;
    Pb = Pa:GeneratePredicates(P2, Pb); // Generate active elements
Loop2:                                 // Constrained by Pa
    temp = Pb:Read(A[Dx]);             // Following code predicated on Pb
    temp = Pb:Add(temp, r);
    Pb:Write(A[Cx],temp);
    Pb = Pa:GeneratePredicates(P2, Pb); // Additional elements of Pa?
    jnz Loop2
    Pa = GeneratePredicates(P1, Pa);   // Additional elements of vector
    jnz Loop1
Adjust Index (x)                       // Additional iterations of loop
Branch to Loop if necessary
```

Note that if there are no memory hazards between the elements of A[ ], Loop1 and Loop2 in Table 7 do not actually loop. Instead, the memory-hazard checking finds no memory hazards so the predicate vectors enable all elements. Thus, the only looping that occurs is over Loop0 in Table 7, which results in maximum efficiency.

In situations where there are memory hazards between elements of A[ ] referenced by C[ ] and D[ ], Loop1 will fall-through, and the read of A[B[x]] will remain a full-width operation. Thus, Loop2 will iterate in a manner that prevents incorrect behavior until the full vector is satisfied. Furthermore, in situations where there are memory hazards between elements of A[ ] referenced by B[ ] and C[ ], Loop1 will iterate with multiple partial-vectors. Note that if no memory hazards are found between C[ ] and D[ ] then Loop2 will not iterate. Instead, it will process the full partial width indicated by Pa. And in situations where there are also memory hazards between C[ ] and D[ ], the partial vector specified by Pa in Loop1 (satisfying memory hazards between B[ ] and C[ ]) may be further decomposed to accommodate memory hazards between C[ ] and D[ ] in Loop2, and specified in Pb).

Note that the construction in this example allows a macroscalar processor or microprocessor to adjust its parallelism to dynamic memory hazards on a case-by-case basis at run time, thus ensuring correctness while enabling maximum parallelism.

In some embodiments, the CheckHazard instructions may be extended to incorporate more than two items. These embodiments may be useful because the number of two-operand CheckHazard instructions required to cross-check N items for memory hazards varies as the order of N-squared. Furthermore, it is often possible for the potential for memory hazards to exist where there are actually no memory hazards. As a consequence, the extended CheckHazard instructions may also reduce the amount of overhead due to memory-hazard checking. And the extended CheckHazard instructions may generate more efficient results in the presence of memory hazards than multiple instances or applications of the two-input version of this instruction. Note that in the discussion that follows, the instruction "CheckHazard" is intended to encompass all of the versions of CheckHazard instructions described herein.

Table 8 presents pseudo-code for a sequence of instructions. In some embodiments, these instructions are replaced by a 3-way memory-hazard check, i.e., the command P=CheckHazard(A, B, C).

TABLE 8

```
P = CheckHazard(A, B);
P = P | CheckHazard(B, C);
P = P | CheckHazard(A, C);
```

Figure 8:
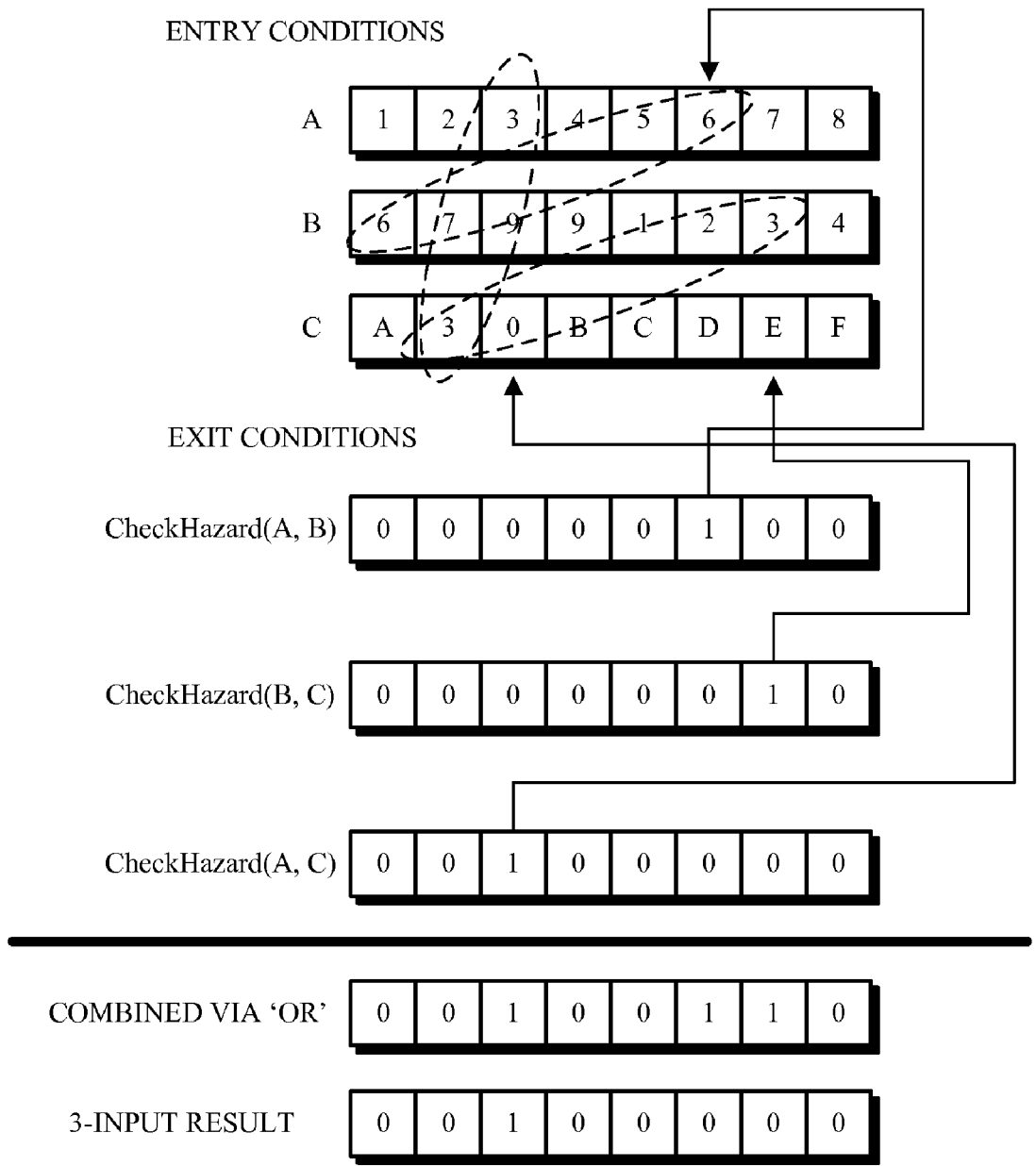
FIG. 8 illustrates the determination of stop indicators in accordance with an embodiment of the present invention.

As discussed previously, a break in parallelism may affect the criticality of subsequent memory hazards, sometimes rendering them benign. Because of this effect, a 3-input CheckHazard instruction has the potential to recognize more benign memory hazards than the 3-instruction code sequence shown in Table 8. This is illustrated in FIG. 8, which presents the determination of stop indicators in accordance with an embodiment of the present invention. Note that P1 determined by ORing the results obtained using 3-consecutive applications of CheckHazard has more stop indicators than P1 determined using a 3-input CheckHazard instruction. Thus, three sequential checks for memory hazards are combined in a way that that over-constrains parallelism because of the change in criticality of certain memory-hazard items is not recognized, while a 3-input memory-hazard check correctly handles benign memory hazards. In addition, note that P1 determined by ORing the results obtained using 3-consecutive applications of CheckHazard requires four passes over the body of the loop, while P1 determined using a 3-input CheckHazard instruction requires 2 passes over the body of the loop.

Note that it is possible to approximate the efficiency of the extended CheckHazard embodiments while checking fewer variables in parallel. In particular, it is possible to chain CheckHazard instructions together by passing the results of previous CheckHazard instructions as inputs to subsequent CheckHazard instructions, thereby allowing them to recognize previously-identified breaks in parallelism in the calculation of subsequent stop indicators. Furthermore, by combining previous results during the calculation, it is possible to eliminate the external combination.

This is illustrated in FIG. 9, which presents the determination of stop indicators in accordance with an embodiment of the present invention. In this embodiment, the predicate indicating a memory hazard from the (A, B) check is carried-forward. Even though this stop indicator becomes redundant after the check of (A, C, there is not enough data to identify this stop indicator as redundant, and so it carries forward. Note that the stop indicator normally set by the check of (B, C) may be identified as being redundant based on the stop indicator set by the check of (A, B). Also note that the three instructions may be executed in a single pass.

Instructions described in the preceding discussion generate predicate vectors that indicate which elements exhibit critical memory hazards. This result provides all the memory-hazard information for the complete vector width, and allows multiple passes to use this data without the need to recalculate the memory-hazard information. However, this data is not directly usable to enable/disable elements of the vector during processing, and thus a separate generate step is required to delineate which elements may safely be processed in parallel. Note that in the discussion that follows, a CheckHazard instruction for a partial vector is referred to as a CheckHazardGen instruction.

As discussed below, if one is willing to calculate memory-hazard information every pass, it is possible to return memory-hazard information for a partial vector that is formatted to be directly used by predicated instructions. In particular, the predicate used for the previous pass is included as an input to the CheckHazardGen instruction, allowing the instruction to determine the appropriate 'next' set of predicates. In this case, a null-predicate is used to indicate the first pass. Furthermore, the instruction sets a flag to indicate when processing of the vector is complete, i.e., no additional passes are required.

Consider the operations in the loop presented in Table 9 and the associated determination of stop indicators presented in FIG. 10. Note that each instance of the CheckHazardGen instruction is predicated on P, and that when P is a null set it indicates the end of passes for a given partial vector. Furthermore, the operations illustrated in FIG. 10 may be repeated for multiple vectors or partial vectors.

TABLE 9 for (x=0; x<100; ++x)
   A[C[x]] = A[B[x]] + 1;

Note that CheckHazardGen instruction may also be predicated, possibly to subject it to the requirements of enclosing CheckHazardGen instructions, in the manner described previously. Table 10 presents an example of operations in a loop and Table 11 presents corresponding pseudo-code.

TABLE 10 for (x=0; x<100; ++x)
{
  r = A[B[x]];
  A[C[x]] = A[D[x]] + r;
}

TABLE 11

```
Loop:
    Bx = Read B[x * VECLEN];           // Load B, C, D vectors
    Cx = Read C[x * VECLEN];           // (Indexes into A[ ])
    Dx = Read D[x * VECLEN];
    Pa = 0;
    Pa = CheckHazardGenVR(Pa, Bx, Cx); // Check B vs C
Loop1:                                 // Active elements
                                       // indicated by Pa
    r = Pa:Read(Bx); // Read A (per Pa)
    Pb = 0;
    Pb = Pa:CheckHazardGenVR(Pb, Dx, Cx);  // Check D vs C
Loop2:                                 // (Constrained by Pa)
    temp = Pb:Read(Dx);
    temp = Pb:Add(temp, r);
    Pb:Write(Cx, temp);
    Pb = Pa:CheckHazardGenVR(Pb, Cx, Dx);  // Completed Pa?
    jnz Loop2
    Pa = CheckHazardGenVR(Pa, Bx, Cx);     // Completed vector?
    jnz Loop1
Adjust Index (x)                       // Additional loop
                                       // iterations?
(Branch to Loop if necessary)
```

In some embodiments, CheckHazardGen is predicated (as illustrated in Table 11), or extended to check more than two inputs for memory hazards. Because CheckHazardGen makes no attempt to analyze memory hazards beyond the first critical memory-hazard identified in a given pass, chaining may be effectively accomplished by predicating the CheckHazardGen instructions in the chain based on the results of prior CheckHazardGen instructions.

Figure 12A:
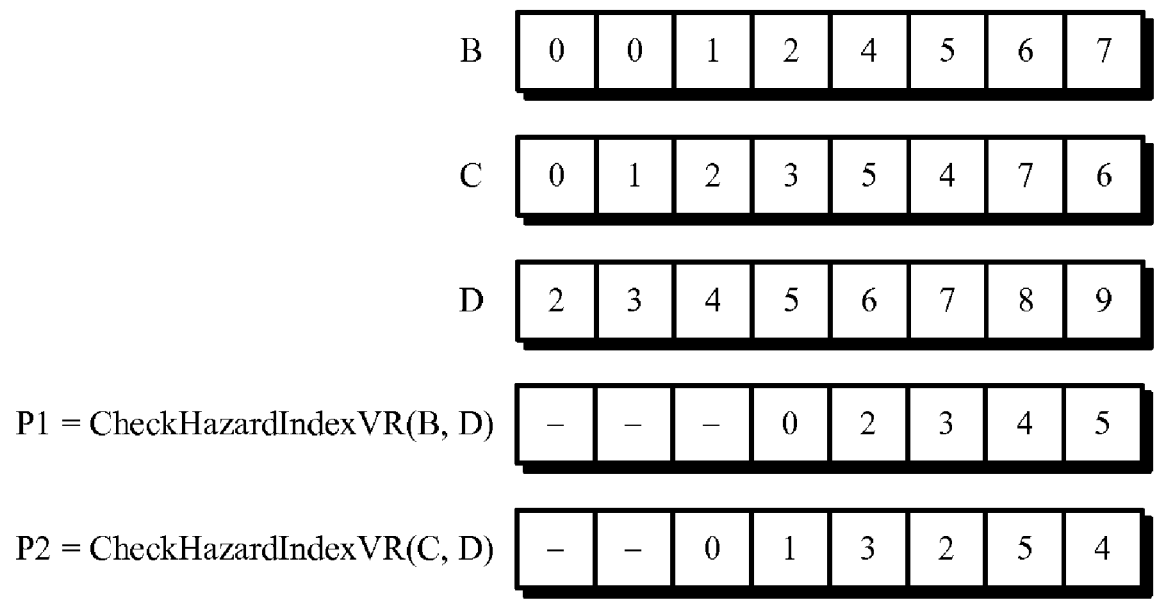
FIG. 12A illustrates the determination of memory hazards in accordance with an embodiment of the present invention.

FIG. 12A illustrates an embodiment of the determination of memory hazards, which may include critical memory hazards. Note that a memory hazard that "straddles" a critical memory hazard is by definition a non-critical memory hazard, since proper handling of the critical memory hazard causes the straddling memory hazard to also be handled correctly. For example, the '2' at position 3 in vector B has a critical memory hazard against the '2' at position 0 in vector D. Consequently, a stop indicator (and a predicate value) will occur at position 3. However, this stop indicator will therefore cause the memory hazard of the '4' at position 4 in vector B against the '4' at position 2 in vector D to be a non-critical memory hazard, as it straddles the critical memory hazard.

In some embodiments, redundant information or non-critical memory hazards are removed during the detecting or determining of the critical memory hazards. This refining operation is facilitated by tracking the vector element positions associated with memory hazards. We now discuss these embodiments.

Figure 11A:
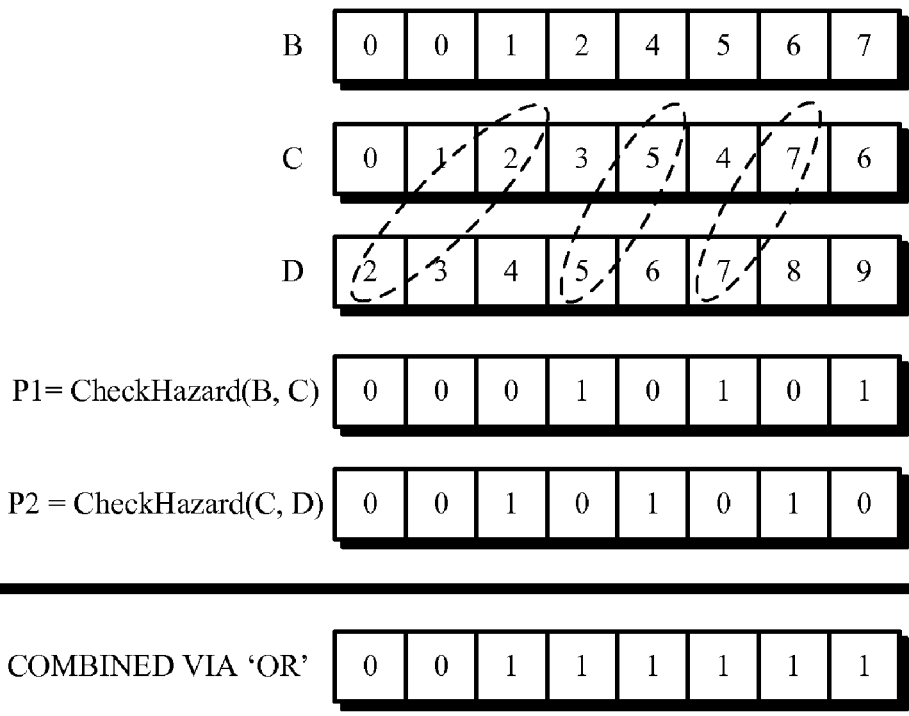
FIG. 11A illustrates the determination of stop indicators in accordance with an embodiment of the present invention.
Figure 11B:
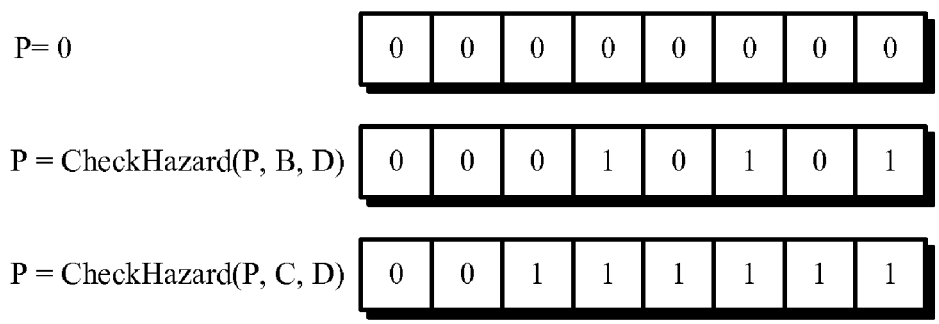
FIG. 11B illustrates the determination of stop indicators in accordance with an embodiment of the present invention.

Consider the pseudo-code shown in Table 12, with vector B={0, 0, 1, 2, 4, 5, 6, 7}, vector C={0, 1, 2, 3, 5, 4, 7, 6} and vector D={2, 3, 4, 5, 6, 7, 8, 9}. As illustrated in FIG. 11A, unchained CheckHazard Instructions result in seven passes over the body of the loop to complete one vector. Moreover, as illustrated in FIG. 11B, using the chained version of these instruction does nothing to improve this.

TABLE 12 for (x=0; x<100; ++x)
{
   A[D[x]] = A[B[x]] + A[C[x]];
} result at the vector position of the element in FirstArg that it has the conflict with. Moreover, if there are no conflicts, a negative number is recorded at that position.

TABLE 13

```
vector CheckHazardIndex(vector FirstArg, vector SecondArg)
{
  vector result;
  int x,y;
  for (x=0; x<veclen(FirstArg); ++x)
  {
    result[y] = -1;
    for (y=0; y<x; ++y)
    {
      if (SecondArg[y] == FirstArg[x])
      {
        result[x] = y;
      }
    }
  }
  Return(result);
}
```

Figure 12B:
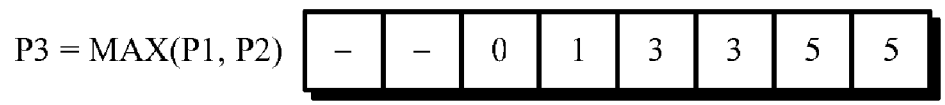
FIG. 12B illustrates the determination of memory hazards in accordance with an embodiment of the present invention.

Referring back to FIG. 12A, note that all memory hazards are tracked whether or not they are critical hazards. These memory hazard index vectors may be combined using a MAX function or operation (or in some embodiments, using a MIN function or operation), as illustrated in FIG. 12B. In particular, the MAX operation takes the biggest value at a given element or position in the vectors being compared. As we will see below, this is an example of a refining operation, which removes redundant information and/or non-critical memory hazards.

Once the memory hazards have been determined, binary stop indicators associated with the critical hazards can be generated. For example, these stop indicators may be generated from the memory hazard index vector using the pseudo-code for a CheckHazardStopIndex command shown in Table 14.

However, a better result may be obtained if the element index in the second vector that each element in the first vector conflicts with is tracked using CheckHazardIndex instructions. Note that in the examples below, a dash "-" indicates that there is no memory hazard, while a digit indicates the element number (0-based) in the other vector argument that a given element has a conflict with. In practice, a special number (for example, a negative or some number larger than the number of elements in the vector) may be used to indicate that there is no memory hazard. Alternatively, a 1-based element numbering system can be employed, with zero or some other number representing no hazards. Note that the CheckHazardIndex instruction may also take as a parameter a predicate that specifies which elements of the second vector of memory addresses will be operated on. Moreover, in contrast with the preceding embodiments, in these embodiments all of the memory hazards are initially tracked as opposed to just the critical hazards.

Note that the CheckHazardIndex instruction compares two vectors, and stores information about memory hazards in a destination vector. In particular, each element in the first vector is compared with all lesser-ordered elements in the second vector. If a memory hazard is found for an element in the first vector against any of the compared elements in the second vector, the element position within the second vector where the memory hazard was located is stored in the destination vector element corresponding to the position in the first vector in which the hazard was identified.

An embodiment of the CheckHazardIndex instruction is illustrated by the pseudo-code presented in Table 13. For each element of FirstArg, if any element of SecondArg up to but excluding the position in FirstArg being evaluated, has a memory hazard with the memory location referred to by the element in FirstArg, the position of the conflict in SecontArg is recoded in the This pseudo-code translates from a memory hazard index P3 to binary stop indicators P4. As illustrated in FIG. 12C, P4 results in only four passes over the loop body to process one vector.

TABLE 14

```
List = <empty>
for (x=0; x<VEC_LEN; ++x)
{
  if(P3[x] in List);
  {
    P4[x] = 1;
    List = <x>;
  }
  else
  {
    {
      P4[x] = 0;
      Append <x> to List;
    }
  }
}
```

It is also possible to chain the CheckHazardIndex instructions or the refining operation. This is shown in FIG. 12D, which illustrates an embodiment of the determination of memory hazards. In FIG. 12D, the refining MAX operation is integrated into the CheckHazardIndex operation, allowing these operations to be chained together with previous results.

In some embodiments, an indexed form of the GeneratePredicates instruction can generate predicates directly from the result of a CheckHazardIndex instruction by evaluating the index list as described above.

Moreover, predicates may be generated directly without the intermediate step of generating stop indicators. This is illustrated in FIG. 12E, which shows GeneratePredicatesIndex operations that are performed before the body of a loop. Each operation uses the previous predicate results to determine where to move forward to (i.e., at least a portion of the vector is checked) until there are no more elements to process. Note that in general the instructions for generating predicates return an indicator that a given set of predicates is the final set of the vector (or partial vector), and another indicator to indicate there are no more predicates available. For example, if a sixth GeneratePredicates index operation is performed after the five illustrated in FIG. 12E, 'none remaining' indicator may be returned.

Note that the pseudo-code illustrated in Tables 1-14 and exemplary embodiments illustrated in FIGS. 3-12 may include additional or fewer operations or data structures. Moreover, positions of operations or data structures may be changed and/or two or more operations or data structures may be combined.

Figure 13:
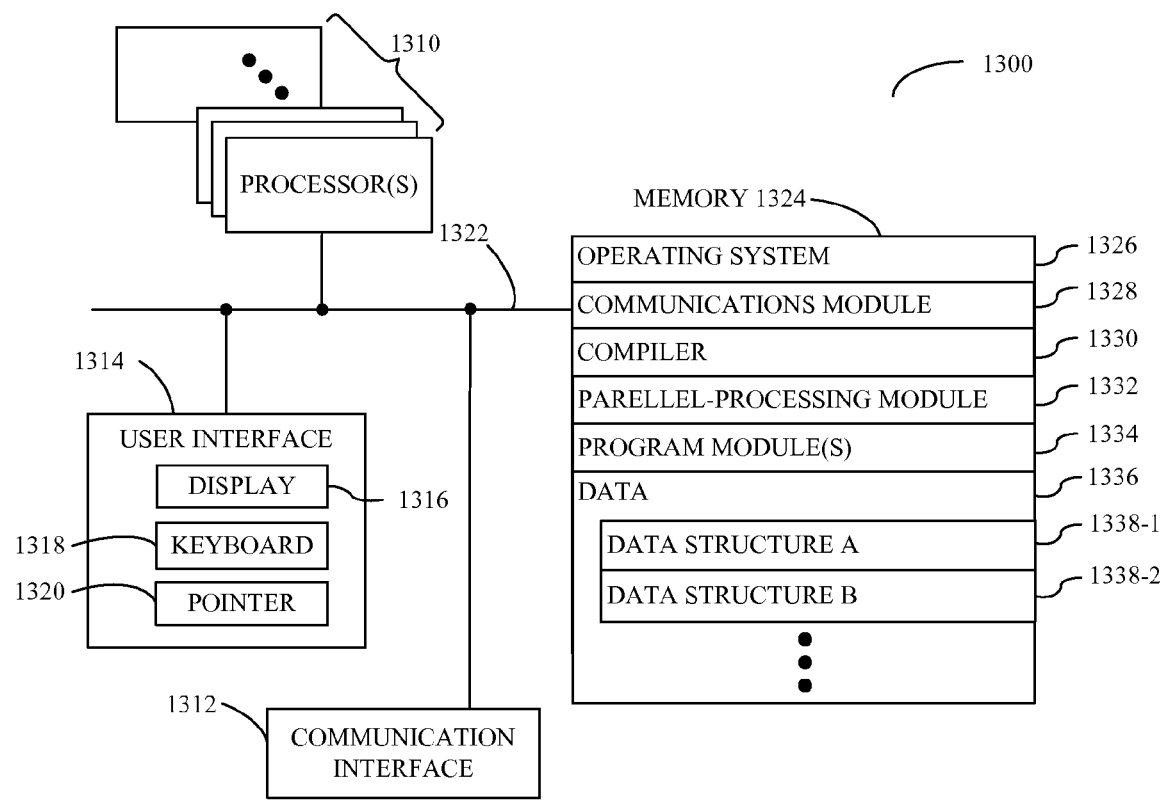
FIG. 13 is a block diagram illustrating a computer system in accordance with an embodiment of the present invention.

We now described computer systems that include compilers that generate instructions based on a feature set of a processor. FIG. 13 is a block diagram illustrating a computer system 1300 in accordance with an embodiment of the present invention. Computer system 1300 includes one or more processors 1310 or processor cores, a communication interface 1312, a user interface 1314, and one or more signal lines 1322 coupling these components together. Note that the one or more processing units 1310 may support parallel processing and/or multi-threaded operation, the communication interface 1312 may have a persistent communication connection, and the one or more signal lines 1322 may constitute a communication bus. Moreover, the user interface 1314 may include a display 1316, a keyboard 1318, and/or a pointer 1320, such as a mouse.

Memory 1324 in the computer system 1300 may include volatile memory and/or non-volatile memory. More specifically, memory 1324 may include ROM, RAM, EPROM, EEPROM, FLASH, one or more smart cards, one or more magnetic disc storage devices, and/or one or more optical storage devices. Memory 1324 may store an operating system 1326 that includes procedures (or a set of instructions) for handling various basic system services for performing hardware dependent tasks. Memory 1324 may also store procedures (or a set of instructions) in a communication module 1328. The communication procedures may be used for communicating with one or more computers and/or servers, including computers and/or servers that are remotely located with respect to the computer system 1300.

Memory 1324 may include a compiler module 1330 (or a set of instructions) for generating instructions (such as program modules 1334) based on the feature set of the processors 1310. These instructions may be distributed to the processors 1310 for execution using parallel-processing module 1332 (or a set of instructions).

Memory 1324 may also include the program modules 1334 (or a set of instructions). Furthermore, memory 1324 may include data 1336, such as data structures 1338.

Instructions in the various modules in the memory 1324 may be implemented in a high-level procedural language, an object-oriented programming language, and/or in an assembly or machine language. The programming language may be compiled or interpreted, i.e., configurable or configured to be executed by the one or more processing units 1310.

Although the computer system 1300 is illustrated as having a number of discrete items, FIG. 13 is intended to be a functional description of the various features that may be present in the computer system 1300 rather than as a structural schematic of the embodiments described herein. In practice, and as recognized by those of ordinary skill in the art, the functions of the computer system 1300 may be distributed over a large number of servers or computers, with various groups of the servers or computers performing particular subsets of the functions. In some embodiments, some or all of the functionality of the computer system 1300 may be implemented in one or more ASICs and/or one or more digital signal processors DSPs.

Computer system 1300 may include fewer components or additional components. Moreover, two or more components may be combined into a single component and/or a position of one or more components may be changed. In some embodiments the functionality of the computer system 1300 may be implemented more in hardware and less in software, or less in hardware and more in software, as is known in the art.

While the techniques in the preceding embodiments have been applied to detecting and mitigating conflicts between memory addresses, in other embodiments these techniques may be applied to detecting and mitigating conflicts between numbers, such as those stored in registers.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing parallel operations in a computer system when one or more memory hazards may be present, comprising:

at runtime, receiving instructions for detecting conflicts between memory addresses in vectors when operations are performed in parallel using at least a portion of the vectors, and generating one or more predicate values corresponding to any detected conflict between the memory addresses, wherein a given predicate value indicates elements in at least the portion of the vectors that can be processed in parallel, wherein the conflicts between the memory addresses are data-dependent and therefore cannot be detected until after the memory addresses have been resolved at runtime, and wherein the instructions are inserted in program code prior to runtime;

wherein while executing the program code, executing the instructions causes a processor to detect the conflict between the memory addresses and generate the one or more predicate values.

2. The method of claim 1, wherein the conflict between the memory addresses includes overlap of the memory addresses.

3. The method of claim 1, wherein the conflict between the memory addresses in the vectors is associated with at least one memory hazard.

4. The method of claim 1, wherein the vectors include a first vector and a second vector;

wherein the conflict is detected by comparing memory addresses in the first vector with memory addresses in the second vector; and wherein a memory address associated with a given position in the second vector is compared to one or more memory addresses in the first vector associated with positions that correspond to loop iterations that are after an iteration corresponding to the given position.

5. The method of claim 1, wherein the vectors include a first vector and a second vector;

wherein the conflict is detected by comparing memory addresses in the first vector with memory addresses in the second vector; and wherein a memory address associated with a given position in the second vector is compared to one or more memory addresses in the first vector associated with positions that correspond to loop iterations that are before an iteration corresponding to the given position.

6. The method of claim 1, wherein the conflict between the memory addresses in the vectors is associated with at least one memory hazard that leads to different results when the memory addresses are accessed in parallel during the operations than when the memory addresses are accessed in program order.

7. The method of claim 1, further comprising rendering a subsequent conflict benign by performing a portion of the operations in parallel.

8. The method of claim 1, wherein the parallel operations are to be performed by multiple processors.

9. The method of claim 1, wherein the parallel operations are to be performed by multiple threads that are to be executed by multiple cores.

10. The method of claim 1, wherein the conflict involves matches between the memory addresses.

11. A compiler configured to generate a set of instructions based on a feature set of a processor, wherein the processor is configured to:

at runtime, receive instructions for detecting conflicts between memory addresses in vectors when operations are performed in parallel using at least a portion of the vectors, and generating one or more predicate values corresponding to any detected conflict between the memory addresses, wherein a given predicate value indicates elements in at least the portion of the vectors that can be processed in parallel, wherein the conflicts between the memory addresses are data-dependent and therefore cannot be detected until after the memory addresses have been resolved at runtime, and wherein the compiler inserts the instructions in program code prior to runtime; and execute the instructions while executing the program code, wherein executing the instructions causes the processor to detect the conflict between the memory addresses and generate the one or more predicate values.

12. The compiler of claim 11, wherein the conflict between the memory addresses includes overlap of the memory addresses.

13. The compiler of claim 11, wherein the vectors include a first vector and a second vector;

wherein the conflict is detected by comparing memory addresses in the first vector with memory addresses in the second vector; and wherein a memory address associated with a given position in the second vector is compared to one or more memory addresses in the first vector associated with positions that correspond to loop iterations that are after an iteration corresponding to the given position.

14. The compiler of claim 11, wherein the vectors include a first vector and a second vector;

wherein the conflict is detected by comparing memory addresses in the first vector with memory addresses in the second vector; and wherein a memory address associated with a given position in the second vector is compared to one or more memory addresses in the first vector associated with positions that correspond to loop iterations that are before an iteration corresponding to the given position.

15. The compiler of claim 11, wherein the conflict between the memory addresses in the vectors is associated with at least one memory hazard that leads to different results when the memory addresses are accessed in parallel during the operations than when the memory addresses are accessed in program order.

16. The compiler of claim 11, wherein the parallel operations are to be performed by multiple processors.

17. The compiler of claim 11, wherein the parallel operations are to be performed by multiple threads that are to be executed by multiple cores.

18. The compiler of claim 11, wherein the compiler is further configured to render a subsequent conflict benign by performing a portion of the operations in parallel.

19. The compiler of claim 11, wherein the conflict between the memory addresses in the vectors is associated with at least one memory hazard.

20. The compiler of claim 11, wherein the conflict involves matches between the memory addresses.

21. A computer system configured to execute a set of instructions to avoid one or more memory hazards while performing parallel operations, comprising:

a processor;

a memory;

an instruction fetch unit within the processor configured to, at runtime, fetch instructions for detecting conflicts between memory addresses in vectors when operations are performed in parallel using at least a portion of the vectors, and generating one or more predicate values corresponding to any detected conflict between the memory addresses, wherein a given predicate value indicates elements in at least the portion of the vectors that can be processed in parallel, wherein the conflicts between the memory addresses are data-dependent and therefore cannot be detected until after the memory addresses have been resolved at runtime, and wherein the instructions are inserted in program code prior to runtime; and an execution unit within the processor configured to execute the instructions while executing the program code, wherein executing the instructions causes the processor to detect the conflict between the memory addresses and generate the one or more predicate values.

22. The computer system of claim 21, wherein the conflict between the memory addresses includes overlap of the memory addresses.

23. The computer system of claim 21, wherein the conflict between the memory addresses in the vectors is associated with at least one memory hazard that leads to different results when the memory addresses are accessed in parallel during the operations than when the memory addresses are accessed in program order.

24. The computer system of claim 21, wherein the parallel operations are to be performed by multiple processors.

25. The computer system of claim 21, wherein the parallel operations are to be performed by multiple threads that are to be executed by multiple cores.

26. The computer system of claim 21, wherein the instruction fetch unit within the processor further configured to fetch instructions for rendering a subsequent conflict benign by performing a portion of the operations in parallel.

27. The computer system of claim 21, wherein the conflict between the memory addresses in the vectors is associated with at least one memory hazard.

28. The computer system of claim 21, wherein the conflict involves matches between the memory addresses.

29. The computer system of claim 21, wherein the vectors include a first vector and a second vector;

wherein the conflict is detected by comparing memory addresses in the first vector with memory addresses in the second vector; and wherein a memory address associated with a given position in the second vector is compared to one or more memory addresses in the first vector associated with positions that correspond to loop iterations that are after an iteration corresponding to the given position.

30. The computer system of claim 21, wherein the vectors include a first vector and a second vector;

wherein the conflict is detected by comparing memory addresses in the first vector with memory addresses in the second vector; and wherein a memory address associated with a given position in the second vector is compared to one or more memory addresses in the first vector associated with positions that correspond to loop iterations that are before an iteration corresponding to the given position.

* * * * *